(12) United States Patent
Gasparro (10) Patent No.: US 7,985,111 B2
(45) Date of Patent: Jul. 26, 2011

(54) SPORT BOARDS WITH CARBON FIBER STRINGERS

(76) Inventor: Gianfranco Gasparro, Los Angeles, CA (US)

( * ) Notice: Subject to any disclaimer, the term of this patent is extended or adjusted under 35 U.S.C. 154(b) by 0 days.

(21) Appl. No.: 12/427,624

(22) Filed: Apr. 21, 2009

(65) Prior Publication Data

US 2009/0264034 A1    Oct. 22, 2009

Related U.S. Application Data

(60) Provisional application No. 61/046,932, filed on Apr. 22, 2008.

(51) Int. Cl.
*B63B 35/81* (2006.01)
(52) U.S. Cl. ............................. 441/74; 441/79
(58) Field of Classification Search ............. 441/65, 441/74, 79
See application file for complete search history.

(56) References Cited

U.S. PATENT DOCUMENTS

| | | | | | |
|---|---|---|---|---|---|
| 3,414,919 | A | * | 12/1968 | Gust | 441/74 |
| 3,802,010 | A | * | 4/1974 | Smith | 441/74 |
| 5,816,875 | A | * | 10/1998 | Bixby | 441/74 |
| 6,036,560 | A | * | 3/2000 | Pekar | 441/65 |
| 7,344,425 | B2 | * | 3/2008 | Yeh | 441/74 |
| 7,347,754 | B1 | * | 3/2008 | Cheung | 441/65 |
| 2008/0099131 | A1 | * | 5/2008 | Umeda et al. | 156/201 |
| 2008/0210137 | A1 | | 9/2008 | Cox | |
| 2008/0211037 | A1 | | 9/2008 | Hyun | |
| 2008/0248701 | A1 | * | 10/2008 | Yeh | 441/65 |
| 2009/0011667 | A1 | | 1/2009 | Hayward et al. | |

* cited by examiner

*Primary Examiner* — Lars A Olson
(74) *Attorney, Agent, or Firm* — Schneck & Schneck; Thomas Schneck (57) ABSTRACT

One or more tubular carbon fiber stringers are axially aligned with the lengthwise dimension of a water sport board, such as a surfboard. A tubular carbon fiber stringer may have vertical shaping tabs reaching opposed major surfaces of the board and laterally extending tabs that register the stringer position inside of a board by fitting in channels that tightly nest the stringer in the board. Tublar carbon fiber stringers, designed to extend more than half the length of a board, may be made by molding symmetric halves, then joining the halves together, or by winding carbon fiber around a mandrel, epoxying the fiber in place and removing the mandrel. Board blanks have openings to seat the tubular stringers, such as by seating in board halves, or a tubular stringer may be seated in an empty board blank mold with foam blown around the stringer.

14 Claims, 8 Drawing Sheets

_Fig. 1_

_Fig. 2_

_Fig. 3_

SPORT BOARDS WITH CARBON FIBER STRINGERS

CROSS-REFERENCE TO RELATED APPLICATION

This application claims priority from provisional application Ser. No. 61/046,932, filed Apr. 22, 2008.

TECHNICAL FIELD

The invention relates generally to horizontally buoyantly supported water sport boards, i.e., boards having opposed major planar surfaces such as surfboards, and more particularly to improved stringers for such boards.

BACKGROUND OF INVENTION

In the manufacture of surfboards, body boards, wake boards and the like, unshaped polyurethane or polystyrene board blanks have been longitudinally split into halves, as shown in U.S. Published Patent Application No. 2008/0210137 to Cox, for adding strengthening members. Longitudinal splitting allows insertion of an elongated stringer or backbone between board halves which are joined together on either side of the stringer. It has been found that a surfboard with a carbon fiber stringer backbone is a stronger and faster surfboard than conventional surfboards having wood or plastic stringers, or no stringer.

The function of any stringer is to distribute forces on upper and lower surfaces of the board over the entire board. Using a carbon fiber stringer, forces on a board are distributed more effectively than with wood or plastic stringers. The unification of a carbon fiber stringer backbone with carbon fiber fins leads to improved force distribution from the fins to the entire board.

In board manufacturing, as taught in the published application to S. Cox, mentioned above, the board is shaped after joining halves together about the stringer. Shaping is done by trimming or adding material from or to the board blank to achieve a curved profile for the board, for example, a prow.

The stringer can be a linear member, typically a length of wood or plastic less than one centimeter wide, with variable thickness. Alternatively the stringer can have an I-beam shape, as shown in the published Cox application. In either case, the stringer is shaped together with halves of the board. For this reason, wood is a preferred material for shaping since wood grain remains tight and does not chip when worked with abrading tools that shape a board. Moreover, since the stringer edge is sometimes visible in a finished board, wood grain displays a nicer appearance than other materials.

The overall objective of stringers is achieving a fast, strong, lightweight board. An object of the invention is to devise a stringer that has improved flex patterns relative to carbon fiber stringers of the prior art, yet can have the favorable qualities of wood stringers. Improved flexing leads to better force distribution on a board and higher board speed.

SUMMARY OF INVENTION

The above object has been achieved with a tubular carbon fiber stringer axially aligned and embedded between longitudinal portions of a sports board, such as a surfboard. A tubular stringer behaves like a mast, flexing in all directions, thereby distributing force over an angular arc, thereby taking better advantage of a board's geometry. In one embodiment, halves of the board are grooved to receive the tubular carbon fiber stringer. In another embodiment, the board is hollow with the tubular carbon fiber stringer tied to ends of the board and vertically secured by means of tabs extending to opposed major surfaces of the board. In all embodiments, tabs can be used to index the position of the stringer before shaping. Horizontal tabs can also be used for indexing the lateral position of the stringer. End tabs can be used to form fins and leashes, as well as to apply tension to the stringer during curing so that the board will experience compression when cured for added strength. The tabs may be either integral with the tubular carbon fiber stringer or may be joined thereto. In the case of vertical tabs, wood may be selected as tab material to provide a preferred display at exposed board surfaces as well as providing a good material for shaping.

In one embodiment, the tubular carbon fiber stringer is formed in halves within a mold and tightly pressed into the mold. Lateral tabs can be integral with molded halves while vertical tabs are joined to the stringer by placing a notch or a boss at opposed top and bottom regions. The tabs can be fitted into opposed notches or set on opposed bosses. In another embodiment, the tubular carbon fiber stringer is formed around a mandrel of selected size by spinning epoxy coated carbon fiber about the mandrel. After the epoxy is cured, the mandrel is removed, and the tubular carbon fiber stringer is then self supporting. The tubular carbon fiber stringer is then joined to a board by placement in a fiber mat that lines grooves of the opposed board halves. The grooves allow axial and lateral nesting of the tubular carbon fiber stringer therein as the board halves are joined together. In the embodiment where the stringer is formed in halves, each half can be pressed into a groove and pressed in place by a pressure member, such as an inflatable bicycle tube.

The tubular carbon fiber stringer can be extended at its ends with tabs formed by carbon fiber mat to provide regions for seating mechanical structures such as fins and leashes. For example, a carbon fiber mat extension of a tubular carbon fiber stringer body can seat a plug that is used to anchor a fin. Multiple plugs can anchor multiple fins. One end tab may be secured at the prow of a surfboard while the aft tab is pulled during stringer curing to establish sufficient tension for tubular stringer elongation of a few percent. When curing is complete, tension is released and the tubular stringer experiences elastic compression upon relaxation thereby strengthening the board in the same manner as a beam under compression is strengthened.

A sport board can employ more than one tubular carbon fiber stringer. Instead of a board being cut into halves with the tubular carbon fiber stringer embedded between halves, the board may be cut into multiple longitudinal pieces with facing grooves that accommodate a tubular carbon fiber stringer within each groove. The stringers may be anchored in place by tabs as described above. The boards may be shaped in the usual way.

BEST MODE OF CARRYING OUT THE INVENTION

Figures 1, 2, 3:
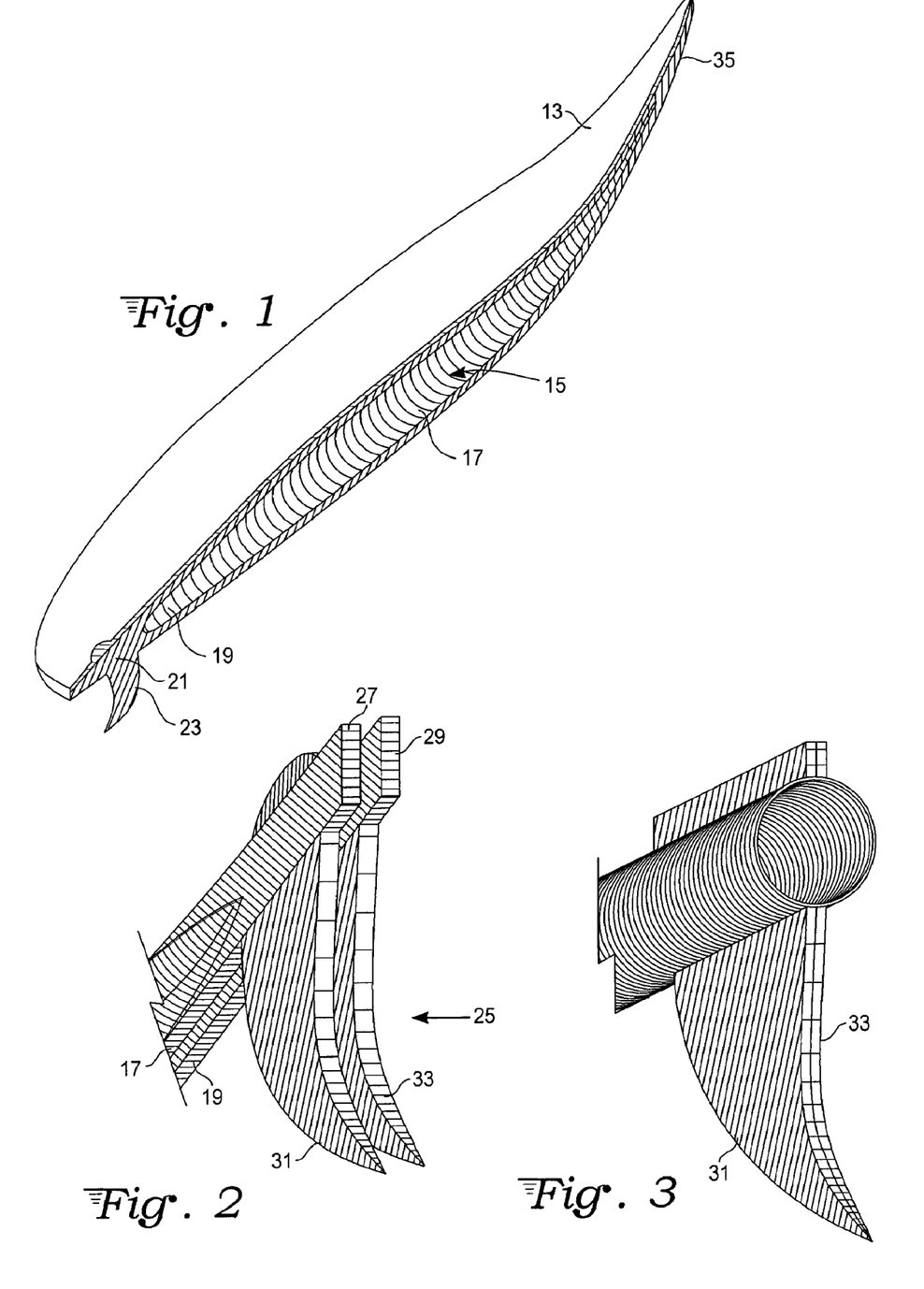
FIG. 1 is a perspective view of half of a longitudinally split surfboard having half of a tubular carbon fiber stringer in accordance with the present invention.
FIG. 2 is a perspective view of two rearward portions of stringer halves, as shown in FIG. 1, joined to form a fin.
FIG. 3 is a perspective view of an alternate fin embodiment with portions of stringer halves, joined to form a fin.

With reference to FIG. 1, a surfboard portion 13 is a longitudinal half of a surfboard blank, having been cut lengthwise along a centerline. The inside of the board has a core 15 which may be hollow, filled or partly hollow and partly filled. The core may be of a different or the same material from the surfboard itself, with the board blank usually being polyurethane or polystyrene. A tubular carbon fiber stringer half 17 may be placed along the longitudinal centerline of the board portion 13. A symmetric half portion, not shown, will later be joined to portion 13, bonded together so that the stringer halves form a tubular member and then both joined board halves will be wrapped in fiberglass and painted. The two stringer halves will form a tubular carbon fiber backbone for the board.

The stringer half 17 has a tubular rearward portion 19 that tapers to an extended flat portion 21 that can include a fin half 23. The fin half can be joined to a symmetric half to form a single fin. A single fin 25 is seen in FIG. 2 formed by the joinder of first and second fin halves 27 and 29, both being extended flat portions of stringer halves. Fin halves can also be formed as an integral part of a tubular carbon fiber stringer half, as seen in FIG. 3, where first fin half 31 is joined to second fin half 33 to form a single fin. Other fin constructions may be implemented as will be described below.

Returning to FIG. 1, the tubular forward portion 35 of stringer half 17 is joined to a symmetric portion, forming a complete tube. A leash hook may be formed by symmetric forward portion halves in the same manner as fin halves are joined to form a fin.

Figure 4:
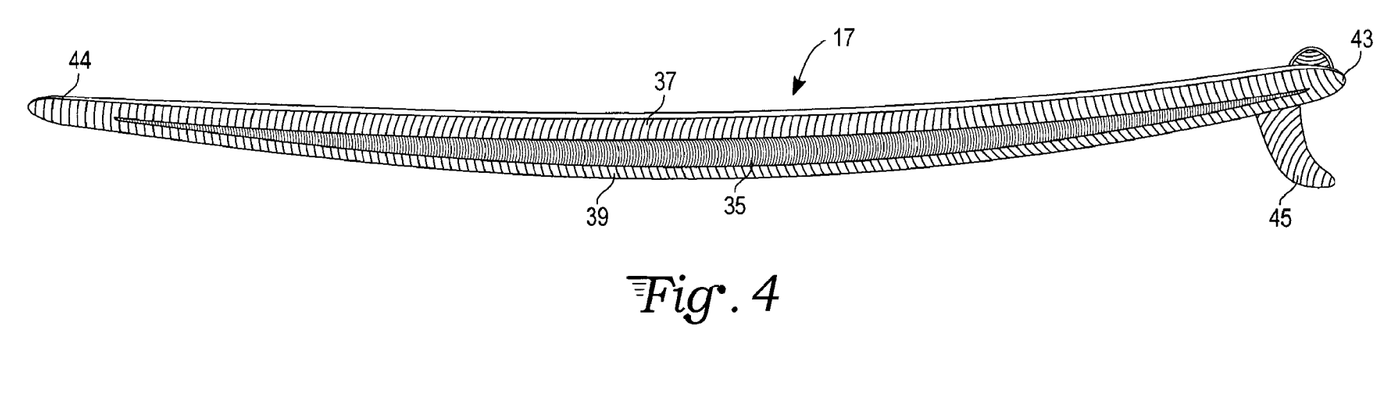
FIG. 4 is a side sectional view of a longitudinally split surfboard similar in shape and construction to the surfboard of FIG. 1 except with shaping tabs.

With reference to FIG. 4, the carbon fiber stringer half 17 may be seen to have a central tubular section 35 with flat vertical tabs 37 and 39 extending above and below the tubular section. The tabs are located in the vertical plane surrounding the tubular section and also extend forwardly in region 44 and rearwardly in region 43 as flat extensions of the tubular section. Vertical tabs are an option that do not appear in the embodiment shown in FIG. 1. The purpose of the tabs is to provide material for shaping of a surfboard blank. As material is trimmed from major surfaces of a surfboard blank by an abrading tool in order to provide a desired contour to the board, part of stringer member is sacrificed. It is important that the shaping tool remove non-tubular regions of the carbon fiber stringer, leaving a tubular carbon fiber stringer with some tab portions for maximum strength. A complete tubular carbon fiber stringer can be thought of as a feather backbone providing strength to a surfboard in the same manner that a tubular structure provides backbone strength to a feather. While shaping vertical tabs 37 and 39 are not essential, they are preferred not only for shaping purposes, but where a tubular carbon fiber stringer is formed integrally and not in sections, the tabs serve to locate the stringer symmetrically between surfboard halves as discussed below. Note that the rearward tab region incorporates a fin half 45.

Figure 5:
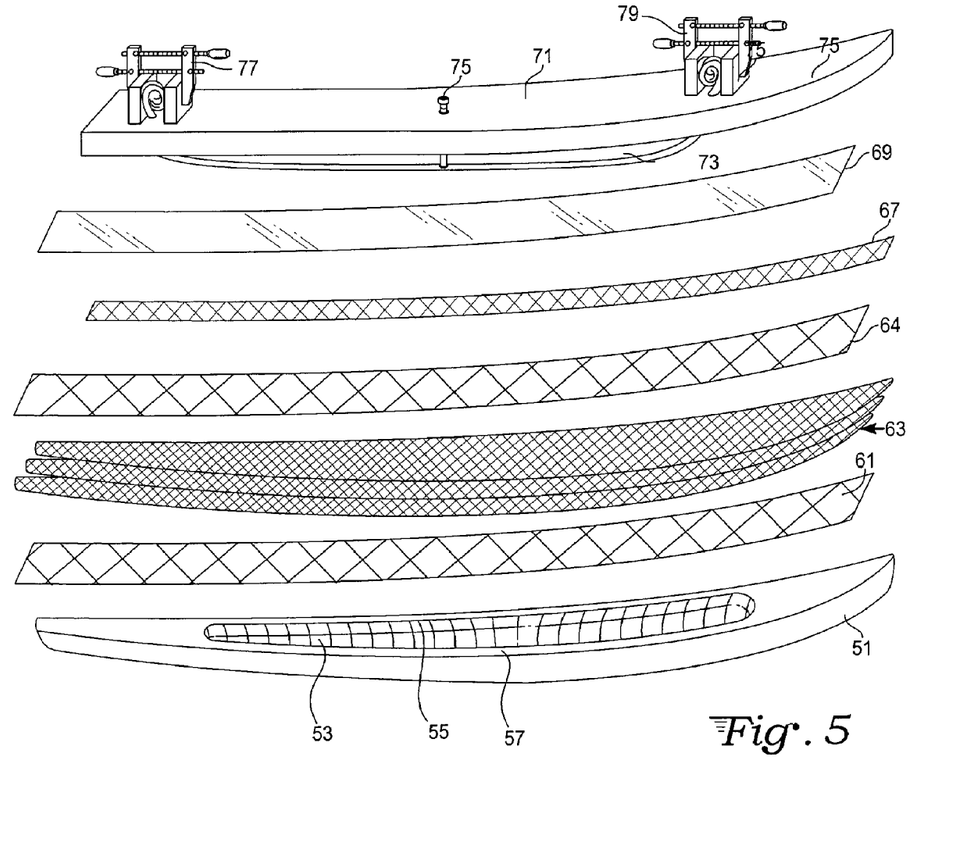
FIG. 5 is a plan view of a layer assembly for constructing half of a tubular carbon fiber stringer in accordance with an embodiment of the present invention.

With reference to FIG. 5, a manufacturing molding technique for making tubular carbon fiber stringer halves employs a number of layers over the half mold 51 that has the desired shape of a carbon fiber stringer half. The center of the half mold is a channel 53 which is a nest where a half tube will be formed. Regions 55 and 57 that are peripheral to the channel 53 are tab halves. A peel ply layer 61 is placed over the half mold 51 so that the final structure can be readily removed from the mold and for bonding to a groove in a board. Next, several carbon fiber matt layers 63 are disposed over the peel ply layer. The number of layers depends upon the desired thickness of the tubular stringer, but usually 2 or 3 layers form a minimal but adequate backbone while 4 to 5 layers will form a moderately stronger backbone. A peel ply layer 64 is placed over the carbon fiber layers. A breather bleeder cloth layer 67 is placed over the peel ply layer 64 and then a bagging material layer 69, i.e., layer of clear plastic, is placed over the bleeder cloth layer. The bagging material layer will be used to press down on the carbon fiber layers 63, pushing them into the channel 53 within half mold 51. To push the carbon fiber layers into the channel 53, a compression plate 71 is used to support a portion of a bicycle inner tube 73 with the air valve stem 75 projecting through plate 71. The tube is secured with clamps 77 and 79 that secure ends of tube 73 at opposed ends of plate 71. When plate 71 is pressed down onto half mold 51 the layers form a tight sandwich. As air is applied to air valve 75, the bicycle tube 73 expands pressing the bagging material layer 69 against the bleeder cloth layer 67 which, in turn, pushes the carbon fiber layers 63 into the channel 53. Once the carbon fiber layers are pressed in place, together with lateral tabs and end tabs, the carbon fiber half stringer may be removed and joined to a symmetric half by epoxy bonding. The entire tubular carbon fiber stringer with lateral tabs and end tabs is coated with UV curable epoxy. Half mold 51 may be clear so that UV light can shine through the mold to cure the epoxy and harden the half stringer in the mold.

Figure 6:
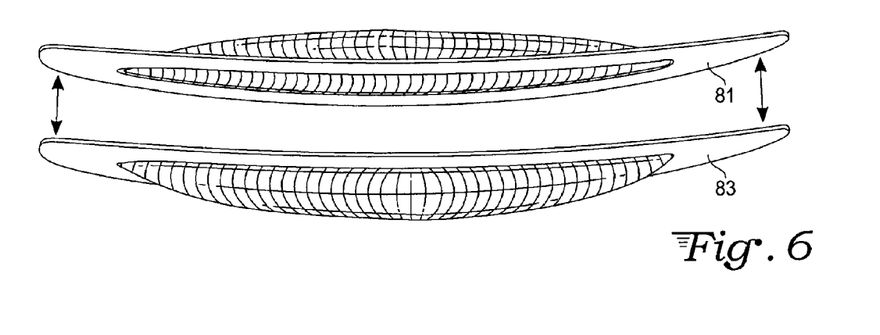
FIG. 6 is a plan view of two halves of an unfinished tubular carbon fiber stringer of the kind shown in FIG. 5 being joined together.

In FIG. 6 the stringer half 81 is joined to the stringer half 83 to form a tubular stringer. The tubular stringer may be placed in a groove cut within the core of a surfboard to receive the tubular stringer.

Tubular carbon fiber stringers can be formed by other means than by the molding process described above. It is possible to form a tubular carbon fiber stringer by wrapping carbon fiber around a mandrel or by spinning carbon fiber about a mandrel.

Figures 7, 8:
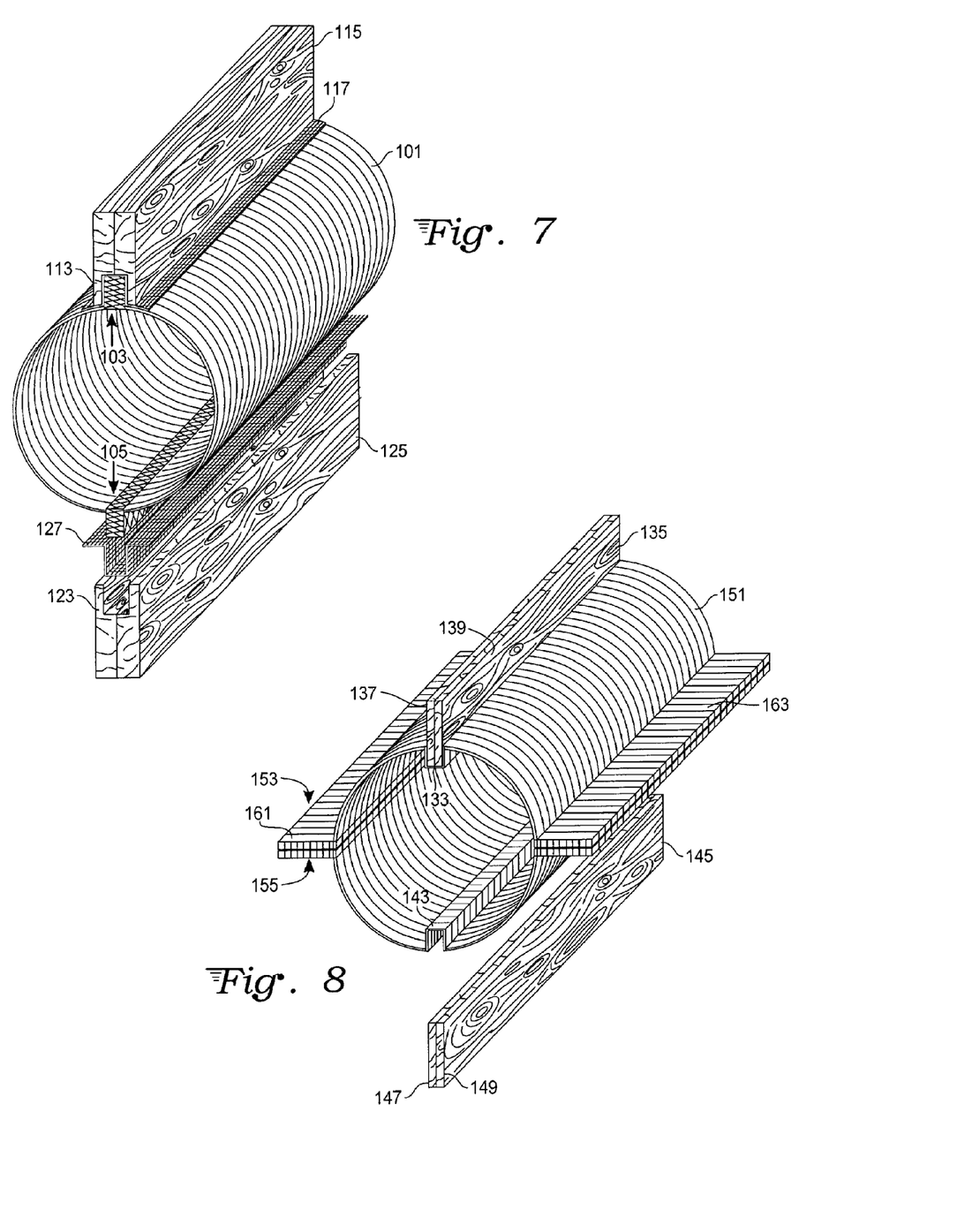
FIG. 7 is a perspective view of a portion of a tubular carbon fiber stringer for use with the surfboard shown in FIG. 4.
FIG. 8 is a perspective view of an alternate embodiment construction of a portion of a tubular carbon fiber stringer for use with the surfboard shown in FIG. 4.

With reference to FIG. 7, carbon fiber tube 101 has been formed by wrapping carbon fiber around a mandrel and then removing the mandrel after epoxy treatment to cement fibers in place. Vertical protrusions in the mandrel allow formation of notches in the vertical positions of the tube including a notch 103 and a notch 105 which are vertical protrusions from the tubular structure. As an alternative method of construction, two carbon fiber half tubes may be joined together at the notches. Each of the notches projects into a receiving tang of a vertical shaping tab 115 and 125. Notch 103 projects into tang 113 of the vertical shaping tab 115 and 125. Notch 105 projects into tang 123 of vertical shaping tab 125. Carbon fiber reinforcement strips 117 and 127 permit a smooth interface between each notch and each receiving tang. The reinforcing strips are slightly wider than each tang and serve as liners for receiving a carbon fiber notch. Each tang and notch will be bonded to this liner. A preferred material for each tang is wood since wood has good shaping qualities. The complete structure of notch, carbon fiber strip and attached tang forms a vertical tab, with one tab being in the 12 o'clock position and the opposite tang being in the 6 o'clock position. The entire structure is mounted in a longitudinal groove of a surfboard.

With reference to FIG. 8, vertical shaping tabs 135 and 145 are mounted in channels 133 and 143 of carbon tube 151. Each of the vertical shaping tabs may be made in two halves, each of which is glued onto a desired location of a surfboard half in a position where a wood stringer outer portion would be. Tab 135 is made of halves 137 and 139 while tab 145 is made of halves 147 and 149. Carbon tube 151 is made in two halves including an upper half 153 and lower half 155 joined together with lateral tabs 161 and 163. The lateral tabs nest in corresponding keyways of the groove that seats the stringer.

The wood half stringers 137, 139 and 147, 149 stay glued on the polymer half boards with half tabs 137 and 147 on one side and half tabs 139 and 149 on the other side. With half tabs in place, the groove for the carbon fiber tube is cut, removing both polymer and wood so that a round groove exists with tab halves at the periphery of the tube. A bit of polymer is removed along inward edges of the vertical half tabs so that they will index within channels 133 and 143 of carbon fiber tube 151 when the carbon fiber tube is placed in the groove. An optional carbon fiber mat strip of the type shown in FIG. 7 can serve as an interface between the shaping tabs and carbon fiber tube. The mat strip is laminated in place. The half boards are routed to provide slots for lateral tabs 161 and 163 that index the lateral position of carbon fiber tube 151 and help maintain the vertical alignment of channels 133 and 143 to properly register the position of shaping tabs 135 and 145. Once the carbon fiber tubular stringer is properly seated, it is bonded in place as the two half boards are joined. Once joined, the outer surface of the board is abraded for shaping. The wood shaping tabs are ground down slightly, together with the surface of the board, thereby exposing fresh wood grain that can be sealed and colored or otherwise treated together with the surface of the board. Surface working of the board gives a board a desired shape, such as an upwardly curving prow and rounded sides. Surfboards are sometimes finished with paint and a fiberglass coating, or an epoxy coating that is cured. Surfboard fins can be part of the carbon fiber tubular stringer as described above, or anchored to a plug as described below. Similarly, ends of the carbon fiber tubular stringer are narrowed and anchored to ends of the board, sometimes under tension from outside of the board. Tension can be applied by using two steel anchor pins, one in the nose of the board, the other in the tail. A pair of thin steel cables can join the stringer to the pins and an external ratchet mechanism used to tighten the cable. After the board is cured, tension may be released and the board is then in compression.

Figure 9:
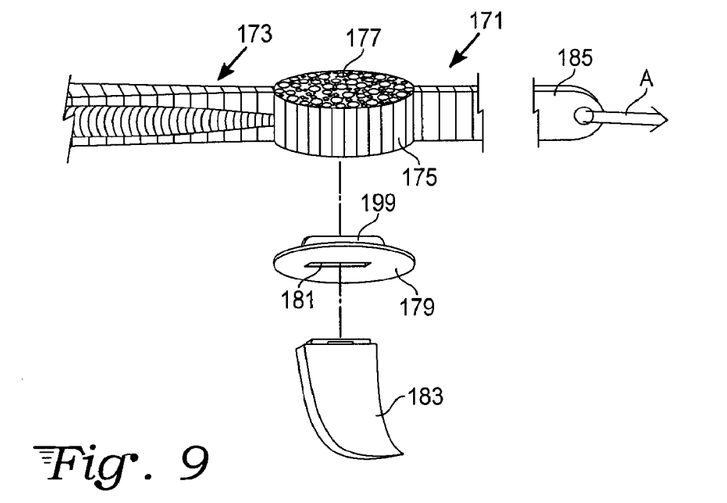
FIG. 9 is a plan view of a fin mounting detail of an end of a tubular carbon fiber stringer of the kind shown in FIG. 6 in a finishing stage of construction.

With reference to FIG. 9, the aft end 171 of tubular carbon fiber stringer 173 is made of half stringers as described above. The half stringers are joined together except at a rearward split 175 where the halves wrap around an epoxy or polymer plug 177 that seats a slotted flange 179 therein. The flange 179 is held securely within plug 177 by means of epoxy or other adhesive. Flange 179 has a slot 181 large enough to accommodate a fin 183. The fin 183 may be secured to the flange 179 by a set screw that secures a fin tab 199. Once plug 177 is epoxied in place, tension, represented by arrow A, is applied from outside of surfboard 185, pulling on the tubular stringer as board halves are joined together. After joining, tension is released as described above.

Figure 10:
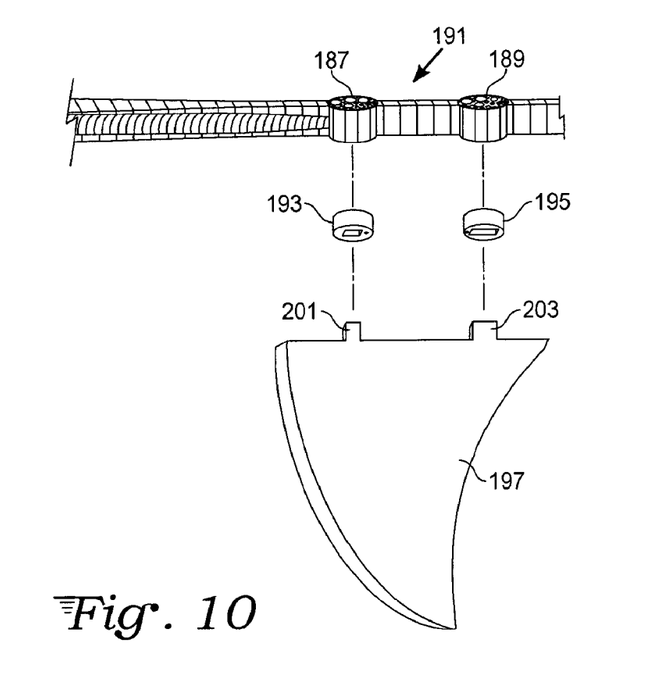
FIG. 10 is a plan view of an alternate fin mounting detail of an end of a tubular carbon fiber stringer of the kind shown in FIG. 9.

In FIG. 10, two polymer plugs 187 and 189 of the type offered under the trademark FCS are wrapped within split halves of a tubular stringer aft end 191. A pair of plastic flanges 193 and 195 are secured in the stringer end by epoxy or the like, then fin 197 is secured in place by insertion of the fin tabs 201 and 203 into slots of flanges 193 and 195 where the fin tabs are secured in place with set screws as in the FCS fin system.

Figure 11:
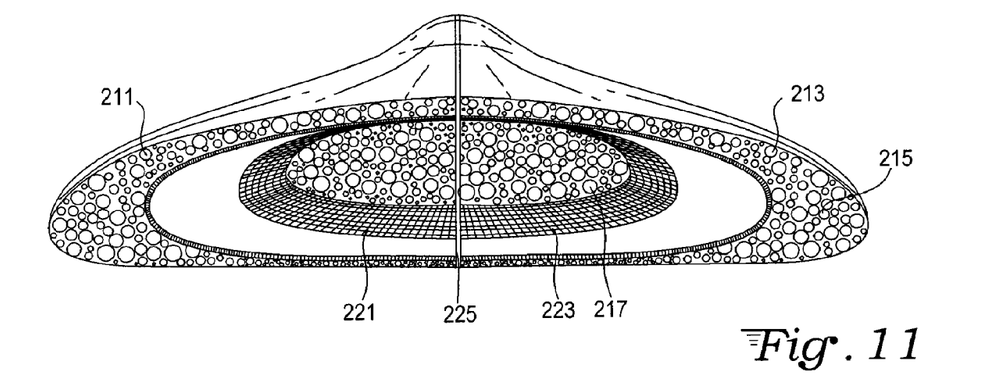
FIG. 11 is a perspective bottom sectional view of a split surfboard in accordance with the present invention having a tubular carbon fiber stringer as shown in FIG. 6 and with a partly filled board core.

Surfboards employing tubular carbon fiber stringers of the present invention may be hollow, as shown in FIG. 11 where surfboard section halves 211 and 213, made of polyurethane or sometimes polystyrene material 215 or the like each have a stringer half 221 and 223 joined to each half, with a central wood shaping tab 225. Note that only an inverted lower section of a board is shown. The inside of the stringer halves is filled with polyurethane material 217 so that two separate filled regions exist.

Figure 12:
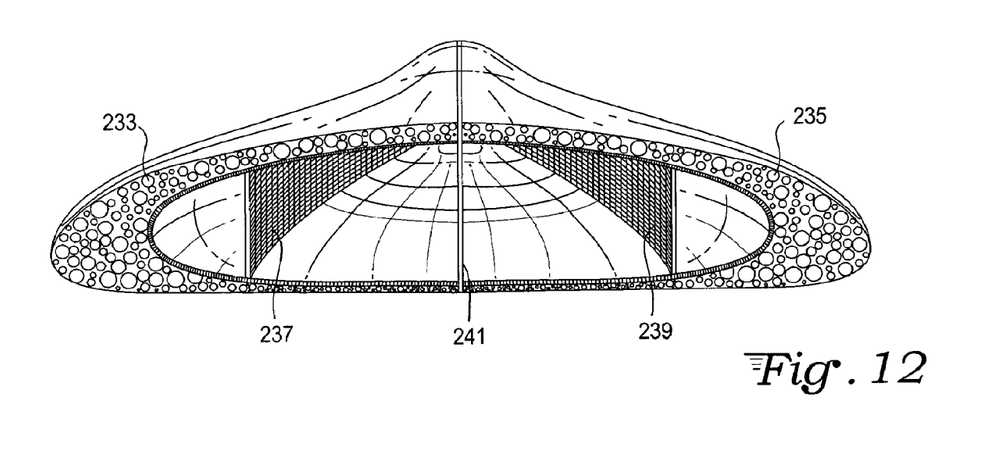
FIG. 12 is a perspective bottom sectional view of a split surfboard in accordance with the present invention having a tubular carbon fiber stringer of the kind shown in FIG. 6 and with a hollow core.
Figure 13:
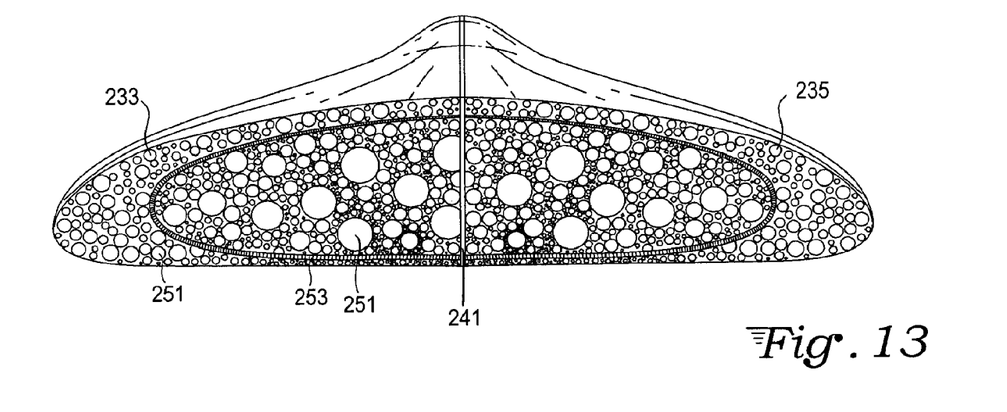
FIG. 13 is a perspective bottom sectional view of a split surfboard in accordance with the present invention having a tubular carbon fiber stringer of the kind shown in FIG. 6 and with different fillers occupying the board core.

In FIG. 12, board section halves 233 and 235 are hollow except for tubular carbon fiber stringer halves 237 and 239 having wood shaping tab 241. In FIG. 13, the same section halves 233 and 235 are completely filled with polymer material 251 on all sides of tubular carbon fiber stringer 253.

Figure 14:
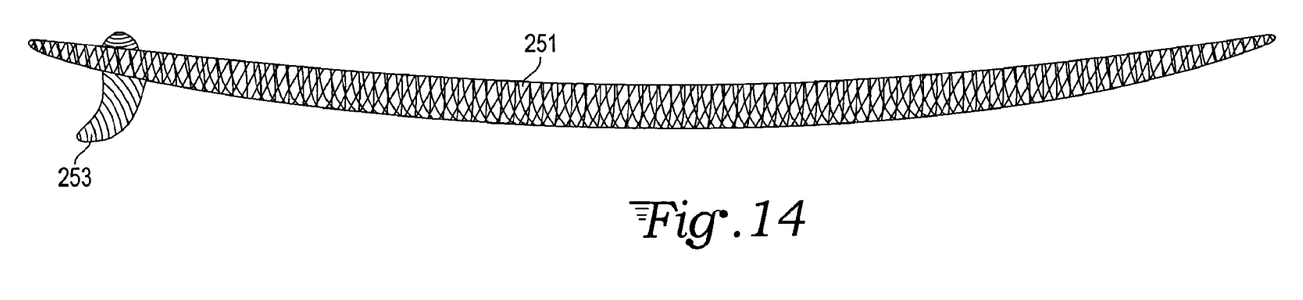
FIG. 14 is a plan view of an alternate carbon fiber stringer construction in accordance with the present invention.

A carbon fiber tubular stringer need not be formed in halves, except where special fillings are desired. When filling is desired, stringer halves are more convenient but if no filling is needed, a tubular carbon fiber stringer can be formed by wrapping carbon fiber about a mandrel, then removing the mandrel and closing the ends after adding pre-formed fin and leash members. A mandrel-formed carbon fiber tubular stringer 251 with pre-formed fin 253 are shown in FIG. 14. The stringer 251 is placed within a groove of board halves, then the board halves are joined together by bonding. The board is then painted and optionally fiberglassed or otherwise hardened with a surface finish.

For joining board halves, the curing process depends upon the type of adhesive bonding. For vinyl resin, two curing stages are used including a first stage at 77° F. for four hours and a second stage at 80° F. for twenty-four hours. During the second stage, the board should not be under tension. Different bonding adhesives require different curing times and temperatures. Some UV curable adhesives can be cured very rapidly, within minutes, under intense UV light.

In an alternate manufacturing method a carbon fiber tubular stringer of the present invention, with vertical tabs and optionally with horizontal tabs can be supported in a hollow mold of a complete board blank. Polyurethane foam is then blown around the carbon fiber tubular stringer to fill the mold. In this manner, the carbon fiber tubular stringer is tightly nested within the board blank at the time of manufacturing the blank.

Figure 15:
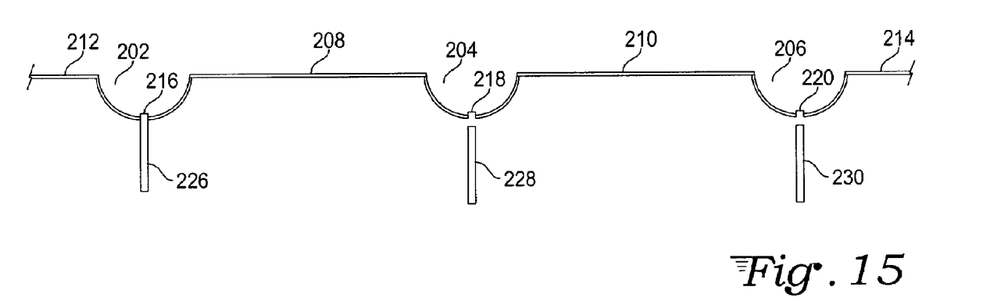
FIG. 15 is a side sectional view of a triple tubular carbon fiber stringer for use with a surfboard.

With reference to FIG. 15, the molding method described with reference to FIG. 5 is used to make a plurality of spaced apart parallel tubular carbon fiber stringers. FIG. 5 shows a molded half of a three stringer structure. Carbon fiber half stringers 202, 204 and 206 are spaced apart by lateral tab halves 208 and 210. The outward lateral tab halves 212 and 214 serve to index the stringer structure in a desired position. Each of the tab halves has a respective notch 216, 218 and 220 for receiving a respective vertical shaping tab 226, 228 and 230. Two symmetric triple stringer halves can be made in the same mold, then joined together as described in FIG. 6.

Figure 16:
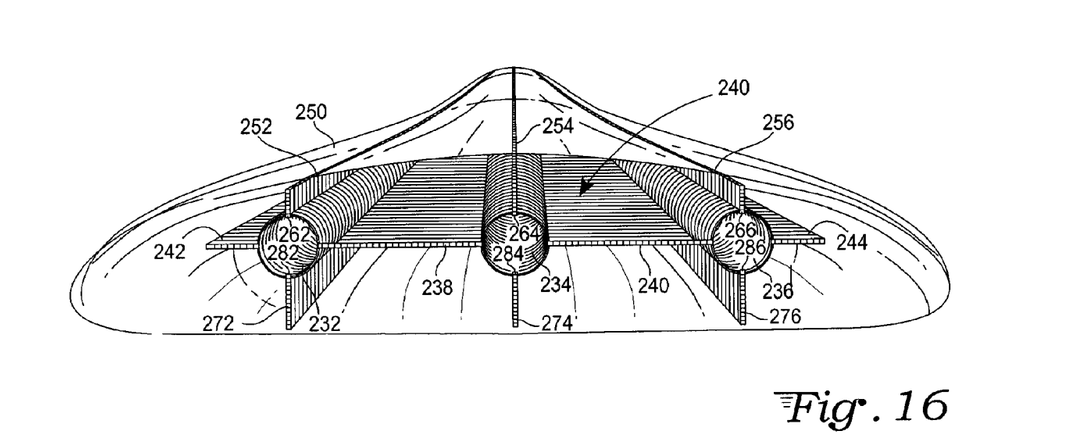
FIG. 16 is a cut-away perspective view of a triple tubular carbon fiber stringer formed by symmetric halves of the type shown in FIG. 14.

With reference to FIG. 16, two symmetric triple stringer halves are assembled to form the triple tubular carbon fiber stringer assembly 240 formed by the three carbon fiber stringers 232, 234 and 236 laterally spaced by the integral lateral tabs 238 and 240. Outward lateral tabs 242 and 244 index the position of the structure within the surfboard. Vertical shaping tabs 252, 254 and 256 are positioned in respective notches 262, 264 and 266 at the twelve o'clock position. Likewise, at the six o'clock position vertical shaping tabs 272, 274 and 276 extend to the lower major surface of surfboard 250 while the upper vertical shaping tabs 252, 254 and 256 extend to the upper major surface of the board. The shaping tabs 272, 274 and 276 are seated in respective notches 282, 284 and 286 formed in the lower triple stringer half.

The triple tubular carbon fiber assembly 240 can be supported in a board blank mold with polyurethane foam blown in around the assembly to fill the mold. Upon filling the mold and hardening, the board may be shaped with the shaping tabs, preferably wood, ground to follow the shape of the major surfaces of the board. Fins may be incorporated into the tubular carbon fiber stringers as previously described.

Figure 17:
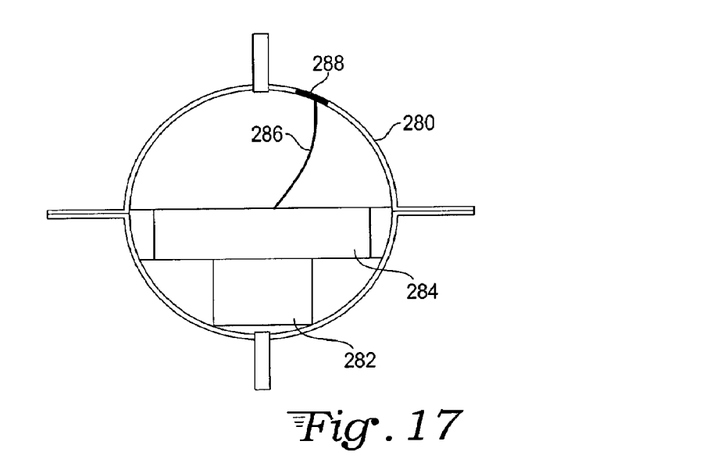
FIG. 17 is a cross sectional view of a tubular carbon fiber stringer of the type shown in FIG. 8 having electronics components therein.

With reference to FIG. 17, the space within a typical tubular carbon fiber stringer 280 may be occupied by battery power packs such as power pack 282, and electronics including heating units and small circuit boards, such as circuit board 284, for GPS navigation, compass and radio units. The electronic circuits have wiring harnesses 286 and waterproof electrical interfaces at the surface of the board for mating to instruments using the circuitry. Alternatively, utilization circuitry 288 could be built into a major surface of a board.

Figures 18, 19, 20:
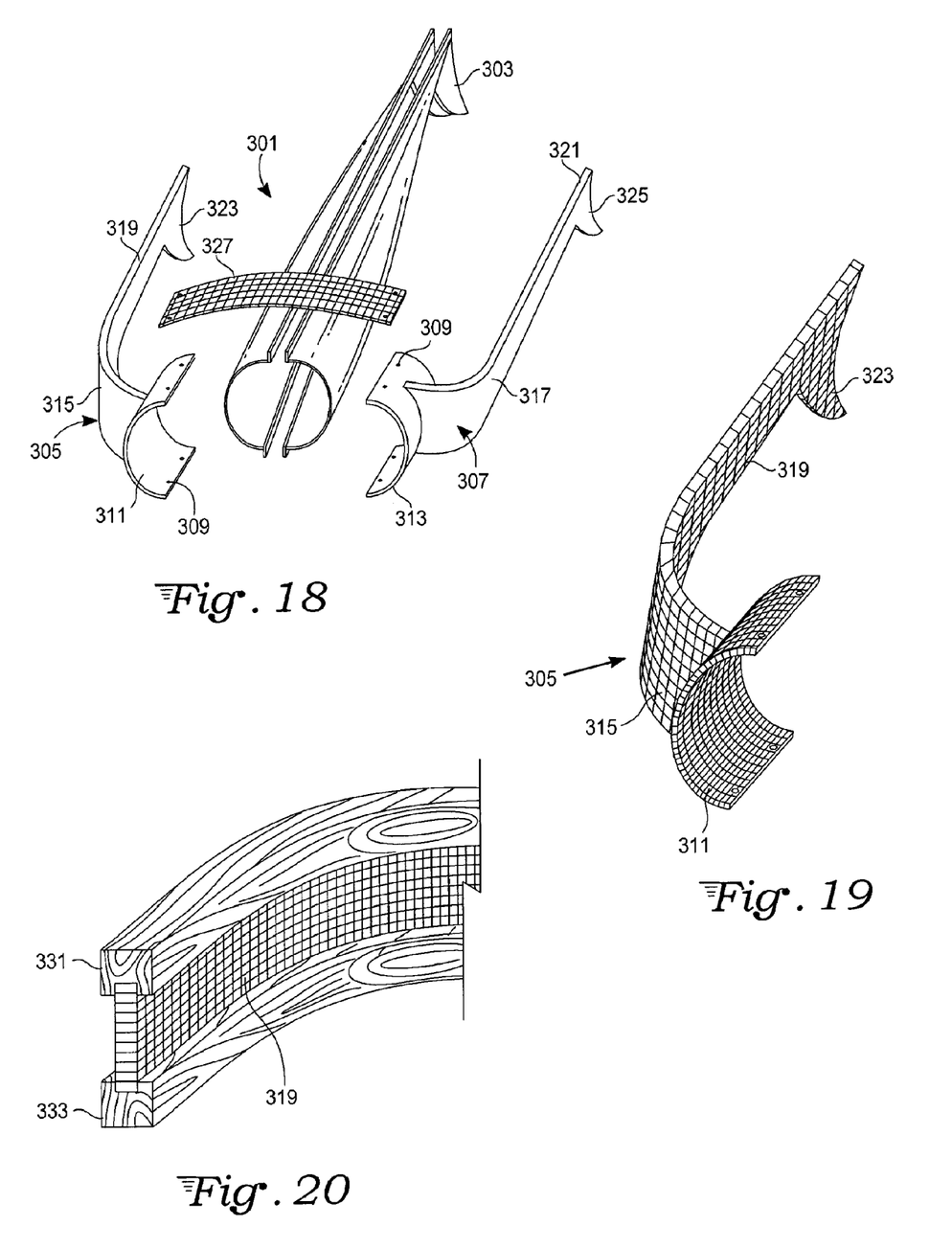
FIG. 18 is a rear perspective view of a pair of side fins mountable on a tubular carbon fiber stringer of the present invention.
FIG. 19 is a rear perspective view of a side fin of the type shown in FIG. 16.
FIG. 20 is a portion of the side fin of FIG. 17 with shaping tabs added.

Side fins, often desired in surfboards, may be attached to a tubular carbon fiber stringer of the present invention as shown in FIG. 18. The tail end 301 of a tubular carbon fiber stringer has principal fin 303 attached, as well as two side fins 323 and 325. Each side fin is joined to the tubular stringer by a respective carbon fiber arm 305 and 307 that is joined to the tubular stringer body by rivets 309 or other fasteners or epoxy bonding. Each side arm and fin has a respective neck region 311, 313; a respective curved shoulder region 315, 317; and a rearwardly extending arm region 319, 321 where side fins 323, 325 are formed at ends of the arms. Each neck region has a forward portion from which an arm extends and a rearward portion used to grip the stringer and to allow for a carbon fiber mat strip 327 to be wrapped as a collar around both necks at least partially or wholly encircling the tail end 301 of the stringer. Side fins 323, 325 are usually the same size or smaller than principal fin 303 and may be made by the molding technique described above for stringer halves. To mount the side fins to a board, slots must be cut into the board to accommodate the structures, or the board blank must be blown around the completed structure.

In FIG. 19, regions of side arm 305 may be clearly seen, including neck region 311, shoulder region 315 and rearwardly extending should arm region 319. Side fin 323 is seen to be joined to region 319 in any manner described above. In FIG. 20 arm region 319 is seen to have vertical shaping tabs 331 and 333 joined to the arm. The vertical dimension of the arm and shaping tabs is sufficient to reach opposed major surfaces of the board. The shaping tabs have tines that fit snugly over arm regions.

The invention claimed is:

1. A reinforced sport board comprising:
joined longitudinal members having a length and a width, with upper and lower major surfaces and having a longitudinal groove between the joining longitudinal members,
a carbon fiber stringer disposed in the groove wherein the carbon fiber stringer has first and second wood tabs extending outwardly from the stringer to the upper and lower major surfaces positioning the stringer between the joined longitudinal members whereby wood of the tabs can be trimmed from major surfaces of the board when providing a desired contour of the board in shaping the board.

2. The sport board of claim 1 wherein the carbon fiber stringer has lengthwise compression applied thereto.

3. The sport board of claim 1 wherein the carbon fiber stringer extends more than 40% of the entire length of the board.

4. The sport board of claim 3 wherein the groove is lined with a carbon fiber layer.

5. The sport board of claim 1 wherein the carbon fiber stringer has a major hollow portion and at least one minor planar portion.

6. The sport board of claim 1 wherein said tabs are partly carbon fiber.

7. The sport board of claim 1 wherein the groove has keyways and the carbon fiber stringer has ribs extending laterally outwardly in positions nesting in the keyways thereby fixing the position of the carbon fiber stringer in the groove.

8. The sport board of claim 7 wherein the keyways are laterally opposite each other.

9. The sport board of claim 8 wherein the ribs extending laterally outwardly are at right angles to the tabs.

10. The sport board of claim 9 wherein the ribs are carbon fiber.

11. The sport board of claim 1 wherein the carbon fiber stringer has at least one enlarged plug formed within the stringer and having a lock means for engaging a fin.

12. A stringer for a sport board having a lengthwise dimension, outer upper and lower major surfaces and a flotation core between the surfaces comprising:
at least one carbon fiber stringer member having an axis aligned with the lengthwise dimension of the board, the stringer having a carbon fiber fin joined to the stringer wherein the carbon fiber stringer has two stringer halves, including fin halves, joined together.

13. A stringer for a sport board having a lengthwise dimension, outer upper and lower major surfaces and a flotation core between the surfaces comprising:

at least one carbon fiber stringer member having an axis aligned with the lengthwise dimension of the board, the stringer having a carbon fiber fin joined to the stringer wherein the carbon fiber stringer has axial channels seating first and second vertical tabs.

14. A stringer for a sport board having a lengthwise dimension, outer upper and lower major surfaces and a flotation core between the surfaces comprising:

at least one carbon fiber stringer member having an axis aligned with the lengthwise dimension of the board, the stringer having a carbon fiber fin joined to the stringer wherein the carbon fiber member has opposed horizontal tabs seated in corresponding keyways in the core.

* * * * *